US009034297B2

(12) United States Patent
Mercuri

(10) Patent No.: US 9,034,297 B2
(45) Date of Patent: *May 19, 2015

(54) PRODUCTION OF NANO-STRUCTURES

(75) Inventor: Robert Angelo Mercuri, Seven Hills, OH (US)

(73) Assignee: DIRECTA PLUS S.P.A., Lomazzo (CO) (IT)

(*) Notice: Subject to any disclaimer, the term of this patent is extended or adjusted under 35 U.S.C. 154(b) by 0 days.

This patent is subject to a terminal disclaimer.

(21) Appl. No.: 12/794,872

(22) Filed: Jun. 7, 2010

(65) Prior Publication Data

US 2011/0300056 A1 Dec. 8, 2011

Related U.S. Application Data

(63) Continuation-in-part of application No. 11/422,914, filed on Jun. 8, 2006, now Pat. No. 7,754,184.

(51) Int. Cl.
*C01B 31/04* (2006.01)
*C01B 31/02* (2006.01)
*B82Y 30/00* (2011.01)
*B82Y 40/00* (2011.01)

(52) U.S. Cl.
CPC ............ *C01B 31/0213* (2013.01); *B82Y 30/00* (2013.01); *B82Y 40/00* (2013.01); *C01B 31/0226* (2013.01); *C01B 31/0423* (2013.01); *C01B 31/0469* (2013.01)

(58) Field of Classification Search
USPC ......................................................... 423/448
See application file for complete search history.

(56) References Cited

U.S. PATENT DOCUMENTS

| 3,404,061 | A | * | 10/1968 | Bochman et al. | ............. 428/143 |
| 4,749,514 | A | | 6/1988 | Murakami | |
| 4,946,892 | A | | 8/1990 | Chung | |
| 6,015,065 | A | * | 1/2000 | McAlister | ..................... 220/586 |
| 6,358,375 | B1 | | 3/2002 | Schwob | |
| 6,406,612 | B1 | | 6/2002 | Greinke | |
| 6,432,336 | B1 | | 8/2002 | Mercuri et al. | |
| 6,448,412 | B1 | | 9/2002 | Murphy et al. | |
| 6,645,456 | B2 | | 11/2003 | Ottinger et al. | |
| 6,683,783 | B1 | | 1/2004 | Smalley et al. | |
| 6,716,525 | B1 | | 4/2004 | Yadav et al. | |

(Continued)

FOREIGN PATENT DOCUMENTS

| AT | 544726 | 5/2008 |
| AU | 200304185 | 12/2004 |

(Continued)

OTHER PUBLICATIONS

Dai, Carbon Nanotubes: Synthesis, Integration, and Properties, Acc. Chem. Res. 2002; 35: 1035-1044.*

(Continued)

*Primary Examiner* — Daniel C McCracken
(74) *Attorney, Agent, or Firm* — Steinfl & Bruno LLP

(57) ABSTRACT

A process for the production of nano-structures is presented, involving providing a graphite flake comprising graphene layers; intercalating the graphite flake to form a graphite intercalation compound exhibiting Stage I, II or III intercalation; and exfoliating the graphite intercalation compound by exposing it to a temperature between about 1600° C. and about 2400° C. such that a plurality of individual graphene layers are separated from the graphite intercalation compound.

27 Claims, 1 Drawing Sheet

(56) References Cited

U.S. PATENT DOCUMENTS

| | | | |
|---|---|---|---|
| 6,716,626 | B1 | 4/2004 | Itoh et al. |
| 6,761,870 | B1 | 7/2004 | Smalley et al. |
| 6,884,404 | B2 * | 4/2005 | Anazawa et al. .......... 423/447.1 |
| 6,892,874 | B2 | 5/2005 | Pietz |
| 6,982,874 | B2 | 1/2006 | Smalc et al. |
| 7,419,624 | B1 | 9/2008 | Smalley et al. |
| 7,754,184 | B2 * | 7/2010 | Mercuri ....................... 423/448 |
| 2001/0050219 | A1 | 12/2001 | Anazawa et al. |
| 2002/0038766 | A1 | 4/2002 | Greinke |
| 2002/0090330 | A1 | 7/2002 | Smalley et al. |
| 2002/0090331 | A1 | 7/2002 | Smalley et al. |
| 2002/0094311 | A1 | 7/2002 | Smalley et al. |
| 2002/0098135 | A1 | 7/2002 | Smalley et al. |
| 2002/0102196 | A1 | 8/2002 | Smalley et al. |
| 2002/0127162 | A1 | 9/2002 | Smalley et al. |
| 2002/0127169 | A1 | 9/2002 | Smalley et al. |
| 2002/0136681 | A1 | 9/2002 | Smalley et al. |
| 2002/0136683 | A1 | 9/2002 | Smalley et al. |
| 2002/0150524 | A1 | 10/2002 | Smalley et al. |
| 2002/0159943 | A1 | 10/2002 | Smalley et al. |
| 2004/0009118 | A1 | 1/2004 | Phililips et al. |
| 2004/0033189 | A1 | 2/2004 | Kaschak et al. |
| 2004/0120882 | A1 | 6/2004 | Kumar et al. |
| 2005/0249656 | A1 | 11/2005 | Smalley et al. |
| 2005/0260120 | A1 | 11/2005 | Smalley et al. |
| 2005/0271574 | A1 * | 12/2005 | Jang et al. ....................... 423/448 |
| 2008/0048152 | A1 | 2/2008 | Jang et al. |
| 2008/0311025 | A1 | 12/2008 | Smalley et al. |
| 2009/0004094 | A1 | 1/2009 | Smalley et al. |
| 2009/0169463 | A1 | 7/2009 | Smalley et al. |
| 2010/0147188 | A1 | 6/2010 | Mamak et al. |

FOREIGN PATENT DOCUMENTS

| | | | |
|---|---|---|---|
| CN | 101460393 | 6/2009 | |
| DE | 10393067 | 8/2005 | |
| EP | 2038209 | 3/2009 | |
| WO | 2004/108997 | 12/2004 | |
| WO | WO 2004/108997 | * 12/2004 | ................ D01F 9/12 |
| WO | 2008/060703 | 5/2008 | |

OTHER PUBLICATIONS

Lee, et al., Real-time observation of the expansion behavior of intercalated graphite flake, J. Mater. Sci. 2005; 40: 231-234.*
Manning, et al., Synthesis of exfoliated graphite from fluorinated graphite using an atmospheric, Carbon 1999; 37: 1159-1164.*
Si, et al., Synthesis of Water Soluble Graphene, Nano Letters 2008; 8(6): 1679-1682.*
Fitzer, et al., Recommended Terminology for the Description of Carbon as a Solid, Pure & Appl. Chem. 1995; 67(3): 473-506.*
Definition of "directly," accessed online at: http://www.merriam-webster.com/dictionary/directly on Oct. 5, 2013.*
Definition of "direct," accessed online at: http://www.merriam-webster.com/dictionary/direct on Oct. 5, 2013.*
Final Office Action mailed on Sep. 30, 2009 for U.S. Appl. No. 11/422,914, filed Jun. 8, 2006 in the name of Robert A. Mercuri.
Non-Final Office Action mailed on May 21, 2009 for U.S. Appl. No. 11/422,914, filed Jun. 8, 2006 in the name of Robert A. Mercuri.
Non-Final Office Action mailed on Oct. 30, 2008 for U.S. Appl. No. 11/422,914, filed Jun. 8, 2006 in the name of Robert A. Mercuri.
Notice of Allowance mailed on Mar. 9, 2010 for U.S. Appl. No. 11/422,914, filed Jun. 8, 2006 in the name of Robert A. Mercuri.
Non-Final Office Action mailed on May 23, 2012 for U.S. Appl. No. 12/794,882, filed Jun. 7, 2010 in the name of Robert A. Mercuri.
Non-Final Office Action mailed on Aug. 11, 2011 for U.S. Appl. No. 12/794,882, filed Jun. 7, 2010 in the name of Robert A. Mercuri.
Notice of Abandonment mailed on Dec. 20, 2012 for U.S. Appl. No. 12/794,882, filed Jun. 7, 2010 in the name of Robert A. Mercuri.
PCT International Preliminary Report on Patentability mailed on Dec. 10, 2008 for PCT Application PCT/US2007/070036 filed on May 31, 2007 in the name of Directa Plus Patent & Technology Limited.
PCT International Search Report mailed on May 15, 2008 for PCT Application PCT/US2007/070036 filed on May 31, 2007 in the name of Directa Plus Patent & Technology Limited.
PCT Written Opinion mailed on May 15, 2008 for PCT Application PCT/US2007/070036 filed on May 31, 2007 in the name of Directa Plus Patent & Technology Limited.
Dai, H., "Carbon Nanotubes: Synthesis, Integration, and Properties." Acc. Chem. Res. 2002 35: 1035-1044.
Dreyer, D.R., et al., "The chemistry of graphene oxide." Chem Soc Rev 2010 39(1): 228-240 (published online Nov. 3, 2009).
Lee, S., et al., "Real-time observation of the expansion behavior of intercalated graphite flake." J. Mat. Sci. 2005 40: 231-234.
Manning, T., et al., "Synthesis of exfoliated graphite from fluorinated graphite using an atmospheric-pressure argon plasma". Carbon 1999 37: 1159-1164.
Ratner, M., et al., Nanotechnology: A gentle introduction to the next big idea, Chapter 1, 2002, Prentice Hall.
Toyoda, M., et al., Intercalation of formic acid into carbon fibers and their exfoliation, Synth. Metals 2002 130: 39-43.
Yu, T., et al., "Hydrogen Storage Systems for Transportation Application". 2005: Metrans., pp. 1-40.
Chinese Office Action issued for Patent Application No. 200780021065.2 filed May 31, 2007 in the name of Directa Plus Srl. Mail Date: Mar. 30, 2011.
Chinese Office Action issued for Patent Application No. 200780021065.2 filed May 31, 2007 in the name of Directa Plus Srl. Mail Date: Mar. 23, 2012.
Chinese Notification to Grant Patent Right for Invention issued for Patent Application No. 200780021065.2 filed May 31, 2007 in the name of Directa Plus Srl. Mail Date: Dec. 10, 2012.
Supplementary European Search Report issued for EP07868295.2 filed May 31, 2007 in the name of Directa Plus Srl. Mail Date: Sep. 7, 2010.
EPO Communication issued for EP07868295.2 filed on May 31, 2007 in the name of Directa Plus Srl. Mail Date: May 13, 2011.
EPO Communication issued for EP07868295 .2 filed on May 31, 2007 in the name of Directa Plus Srl. Mail Date: Sep. 13, 2011.
Non-Final Office Action mailed on Apr. 2, 2013 for U.S. Appl. No. 13/186,131, filed Jul. 19, 2011 in the name of Robert A. Mercuri.
Final Office Action mailed on Nov. 29, 2013 for U.S. Appl. No. 13/186,131, filed Jul. 19, 2011 in the name of Robert Angelo Mercuri.
Wang, G., et al., Graphene nanosheets for enhanced lithium storage in lithium ion batteries, Carbon 2009, 47: 2049-2053.

* cited by examiner

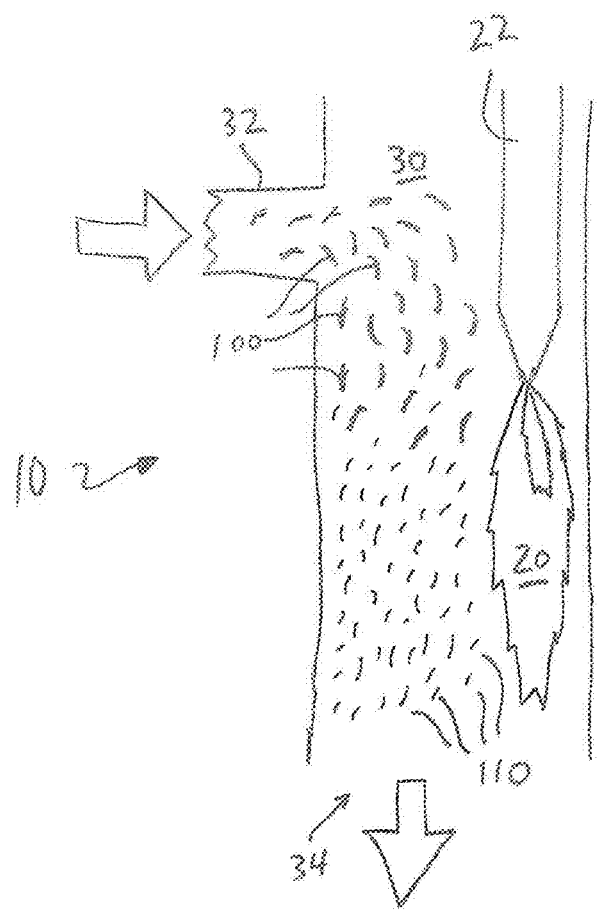

PRODUCTION OF NANO-STRUCTURES

RELATED APPLICATION

The present application is a continuation-in-part of, and claims priority under 35 U.S.C. §120 from, and commonly assigned U.S. patent application Ser. No. 11/422,914, entitled Production of Nano-Structures, filed in the name of Robert A. Mercuri on Jun. 8, 2006, now U.S. Pat. No. 7,754,184 B2, the disclosure of which is incorporated by reference herein.

TECHNICAL FIELD

The present disclosure relates to the production of nano-structures, such as nano-tubes, Buckminster fullerenes (commonly referred to as "buckyballs"), and nano-scale plates. More particularly, the disclosure relates to the production of nano-structures in a process capable of the efficient production of commercial quantities of such nano-structures, using natural graphite starting materials.

BACKGROUND OF THE DISCLOSURE

Nano-structures, especially nano-tubes and buckyballs, have been the subject of extensive research; they have remarkable tensile strength and exhibit varying electrical properties, such as superconducting, insulating, semi-conducting or conducting, depending on their helicity, and are thus utilizable as nanoscale wires and electrical components. The electrical conductivity is as high or higher than copper, thermal conductivity as high as diamond, and the tensile strength of these structures can be 100 times greater than steel, leading to structures that have uses in space, and that are believed to have applications as diverse as the formation of field-effect transistors and nano-motors. Indeed, there are those who believe nano-tubes and other nano-scale structures can be the solution to the hydrogen storage issues bedeviling the nascent hydrogen fuel cell industry, since hydrogen can be adsorbed on their surface.

When referring to nano-structures, what is meant is a structure which is, on average, no greater than about 1000 nanometers (nm), e.g., no greater than about one micron, in at least one dimension. Therefore, in the case of a nano-scale plate, the thickness (or through-plane dimension) of the plate should be no greater than about 1000 nm, while the plane of the plate can be more than one millimeter across; such a nano-plate would be said to have an aspect ratio (the ratio of the major, or in-plane, dimension to the minor, or through-plane, dimension) that is extremely high. In the case of a nano-tube, the average internal diameter of the tube should be no greater than about 1000 nm (thus, with a length of up to a millimeter (mm), the aspect ratio of nano-tubes is also extremely large); in the case of a buckyball, the diameter of the buckyball, such as the truncated icosahedron (the shape of a 60-carbon buckyball), should be no greater than about 1000 nm. A minor dimension of the nano-structure (for instance, the thickness of a nano-scale plate or the internal diameter of a nano-tube), should preferably be no greater than about 250 nm, most preferably no greater than about 20 nm.

Unfortunately, the production of commercial-scale quantities of nano-structures is expensive, laborious and time-consuming, to the extent that doing so is not considered feasible. Production processes currently employed include high pressure carbon monoxide conversion (HiPCO), pulsed-laser vaporization (PLV), chemical vapor deposition (CVD) and carbon arc synthesis (CA). None of these processes is considered adequate in the long term.

Natural graphite is formed of layered planes of hexagonal arrays or networks of carbon atoms, with extremely strong bonds within the layers, and relatively weak bonding between the layers. The carbon atoms in each layer plane (generally referred to as basal planes or graphene layers) are arranged hexagonally such that each carbon atom is covalently bonded to three other carbon atoms, leading to high intra-layer strength. However, the bonds between the layers are weak van der Waals forces (which are less than about 0.4% of the strength of the covalent bonds in the layer plane). Accordingly, because these inter-layer bonds are so weak as compared to the covalent intra-layer bonds, the spacing between layers of the graphite particles can be chemically or electrochemically treated so as to be opened up to provide a substantially expanded particle while maintaining the planar dimensions of the graphene layers.

It is this characteristic of natural graphite which is exploited in the production of sheets of compressed particles of exfoliated graphite (often referred to in the relevant industry as "flexible graphite"), which is used in the production of, inter alia, gasket materials, fuel cell components, electronic thermal management articles and devices, etc. As taught by Shane et al. in U.S. Pat. No. 3,404,061, natural graphite flakes can be intercalated by dispersing the flakes in a solution of a mixture of nitric and sulfuric acids. After intercalation, the flakes can be drained and washed, and are then exposed to temperatures, such as from about 700° C. to about 1000° C., with a high temperature of about 1200° C., which causes the flakes to expand in an accordion-like fashion in the direction perpendicular to the planes of the particle, by an amount that can be greater than 80 times, and as much as about 1000 times or greater, to form what are commonly called "worms." These worms can then be formed in to sheets, even without the presence of binders, which can be formed, cut, molded and otherwise deformed.

Additional processes for the production of these sheets of compressed particles of exfoliated graphite are taught by, for instance, Mercuri et al. in U.S. Pat. No. 6,432,336, Kaschak et al. in International Publication No. WO 2004/108997, and Smalc et al. in U.S. Pat. No. 6,982,874. The unique directional properties of natural graphite (while graphite is commonly referred to as anisotropic, from a crystallographic standpoint, graphite should more properly be referred to as orthotropic or exhibiting transverse isotropy; in the plane of sheet, it is isotropic in two directions along the plane) provide sheets of compressed particles of exfoliated graphite having directional electrical and thermal characteristics, where conductivity is substantially higher along the plane of the sheet as opposed to through the sheet, is leveraged in the production of thermal management articles and fuel cell components.

The intercalation process described above functions to insert a volatile species between the layer planes of the graphite flake which, when exposed to high temperatures, rapidly volatilizes, causes separation of the layers and, consequently, exfoliation. Typical intercalation of graphite for the production of sheets of compressed particles of exfoliated graphite is Stage VII or greater Stage value. The Stage Index is a measure of the average number of graphene layers between each "gallery" (the space between graphene layers in which the chemical intercalant is inserted), rounded to the nearest whole number. Therefore, in Stage VII intercalation, there are, on average, less than 7.5 graphene layers between each gallery. In Stage VIII intercalation, there are, on average, at least 7.5 graphene layers between each gallery.

The Stage Index of an intercalated graphite flake can be determined empirically by x-ray diffraction to measure the "c" lattice spacing (the spacing between any three graphene layers), where a spacing of 6.708 indicates (Å) represents a non-intercalated graphite flake and over 8 Å indicates an intercalated flake with Stage I intercalation (on average, only one graphene layer separating each gallery, or as complete intercalation as possible).

Processes for preparing lower intercalation Stages (more specifically, Stage III and lower) are known. For instance, Kaschak et al. (International Publication No. WO 2004/108997) described a process for preparing Stage V (i.e., intercalation between, on average, every fifth graphene layer) or lower intercalation using supercritical fluids. Other systems for preparing intercalated graphite flakes having Stage III or higher degree intercalation (that is, intercalation to Stage I, II or III) using methanol, phosphoric acid, sulfuric acid, or simply water, combined with nitric acid in various combinations, are known, for both "normal" or "spontaneous" intercalation and electrochemical intercalation.

For instance, an admixture of up to 15% water in nitric acid can provide Stage III or II spontaneous intercalation and Stage I electrochemical intercalation; for methanol and phosphoric acid, an admixture of up to 25% in nitric acid can provide Stage II spontaneous intercalation and Stage I electrochemical intercalation. The chemical or electrochemical potential of the intercalant critically effects the thermodynamics of the process, where higher potential leads to a lower stage number (i.e., a greater degree of intercalation), while kinetic effects such as time and temperature combine to define processes which can be of commercial importance.

What is desired, therefore, is a process for preparing nano-structures in a cost-effective and commercially feasible manner. The desired process will enable the production of nano-structures, whether nano-tubes, buckyballs or nano-plates, in quantities sufficient for industry-scale uses without the requirement of exotic equipment, unusual raw materials or extreme process parameters.

SUMMARY OF THE DISCLOSURE

The present disclosure provides a process for producing nano-scale structures using Stage III or lower graphite intercalation compounds (GICs)(that is, GICs intercalation to Stage I, II or III). GICs are graphite flakes which have been treated with an intercalant under conditions such that a volatile compound is inserted between layer planes of the graphite flake. The intercalation can be spontaneous intercalation or electrochemical intercalation.

The GICs are then exposed to sufficient heat to cause expansion of the intercalated graphite flakes under conditions which cause at least some of the individual graphene layers to separate and thus form nano-structures. In certain embodiments, the GICs are fed into a gas plasma or directly into an arc in a protective environment, such as in an inert gas, or a conditioning gas, such as hydrogen, which can bond to and thus protect active sites. For expansion, high heat flux at the GIC's and reduced pressure both are consistent with energy and inert gas conservation, and provide expansion rather than de-intercalation. In this way, nano-structures are prepared in commercial quantities from natural graphite flakes which have been intercalated so as to form Stage III or lower GICs. At lower heat flux, the GIC is exposed to lower temperatures, which can cause the intercalant to be removed with relatively little disruption (i.e., exfoliation) in the direction of the crystal perpendicular to the graphene layer.

Therefore, an aspect of the present disclosure relates to a process for producing nano-scale structures, such as nano-tubes, Buckminster fullerenes, nano-plates and the like.

Another aspect of the disclosure relates to a process for producing nano-scale structures, which is capable of producing commercial quantities of nano-scale structures.

Yet another aspect of the present disclosure relates to an efficient process for producing nano-scale structures.

Still another aspect of the present disclosure relates to a process for producing nano-scale structures from natural graphite flakes.

Another aspect of the present disclosure relates to a process for producing nano-scale structures from natural graphite flakes in a process which does not require the use of exotic equipment or extreme process parameters.

These aspects of embodiments of the disclosure, and others which will become apparent to the artisan upon review of the following description can be accomplished by providing a process for the production of nano-structures, which includes providing a graphite flake comprising graphene layers; intercalating the graphite flake to form a graphite intercalation compound exhibiting Stage I, II or III intercalation; and exfoliating the graphite intercalation compound by exposing it to a temperature between about 1600° C. and about 2400° C., such that a plurality of individual graphene layers are separated from the graphite intercalation compound. In some embodiments, at least some of the plurality of individual graphene layers spontaneously form a nano-tube or a Buckminster fullerene. The graphite intercalation compound is, in certain embodiments, brought from a temperature at which it is stable to a temperature between about 1600° C. and about 2400° C. in less than 1 second, more preferably less than 0.5 second, and most preferably less than about 0.1 second.

In some embodiments, the graphite intercalation compound is exfoliated by passing it through a reaction zone which includes a region where the temperature is at least about 2600° C., provided that the graphite intercalation compound does not reach a temperature of 2500° C. or higher. In certain embodiments, the reaction zone is at an average temperature of at least about 1500° C.

The graphite flake is preferably intercalated with an intercalant comprising formic acid, acetic acid, water, or combinations thereof, and the graphite intercalation compound is exposed to a supercritical fluid prior to exfoliation. Exfoliation preferably involves suddenly exposing the graphite intercalation compound to a temperature significantly above the decomposition temperature of the GICs. Most preferably the temperature of exfoliation should exceed 1500° C., and temperatures exceeding about 2500° C. or even plasma temperatures as great as about 10000° C. or higher can be employed in the process of the present disclosure. As noted, residence time at these temperatures should be less than 1 second. As noted, it is most preferred that exfoliation take place in an inert or protective environment in order to avoid oxidation of the graphite.

In an advantageous embodiment, exfoliation is accomplished by feeding the graphite intercalation compound into a reaction zone having an inert gas plasma or directly into an arc, especially in a reducing gas environment, such as a hydrogen environment.

The graphite intercalation compound can be exfoliated by being continuously extruded as a compressed rod through a cooled nozzle which opposes a conventional graphite electrode, wherein the extruded graphite intercalation compound and the graphite electrode form a pair between which an arc is struck to rapidly heat the graphite intercalation compound. In addition, a vacuum can be drawn to accelerate exfoliation and direct the extruded stream of exfoliated graphite intercalation compound.

It is to be understood that both the foregoing general description and the following detailed description present embodiments of the invention, and are intended to provide an overview or framework for understanding the nature and character of the invention as it is claimed.

The accompanying drawing is included to provide a further understanding of the disclosure, and is incorporated in and constitutes a part of this specification. The drawing illustrates an embodiment of the disclosure, and together with the description serves to explain the principles and operations thereof.

BRIEF DESCRIPTION OF THE DRAWING

FIG. 1 is a partially broken away side plan view of an apparatus for use as a reaction zone having a gas plasma therein and graphite intercalation compounds passing therethrough to form nano-scale structures.

DETAILED DESCRIPTION

The graphite flakes employed in the present disclosure comprise naturally occurring graphite flakes. Natural graphite is a soft mineral, and possesses a Mohs hardness of 1 to 2, and exhibits perfect basal cleavage. While natural graphite occurs in deposits in different countries around the world in different forms, the preferred natural graphite is crystalline flake graphite, since other types, such as amorphous graphite and so-called "lump" graphite, are considered undesirable for intercalation and exfoliation. Though so-called microcrystalline graphite is not conventionally used in the preparation of exfoliated graphite, it is useful in the process of the present disclosure. Microcrystalline graphite, as is familiar to the skilled artisan, refers to graphite having a microcrystalline structure which can only be observed using x-ray diffraction techniques. While not normally useful in making exfoliated and compressed graphite, a product where graphene layer dimensions are directly related to the useful properties of the product, for nano-structures the layer size of microcrystalline graphite may represent a preferred starting material.

The graphite used in the process of the present disclosure should be relatively free from impurities, meaning it should have a purity of at least about 90%, more preferably at least about 95%. In addition, the size of the graphite flake (by which is meant the diameter of the flake along the α axis, which is the direction parallel to the plane of the flake, or the graphene layers) can be a parameter in achieving the production of nano-structures. Advantageously, the flake used has an average a axis diameter of less than about 100 microns. More preferably, the α axis diameter of the flake employed during the practice of the process of the present disclosure is less than about 60 microns, most preferably less than about 30 microns for products recognizable to the field as "conventional" nanotubes. However, since a desired use of nano-structures such as nano-tubes is adsorption of materials thereon, such as adsorption of hydrogen for hydrogen storage for, e.g., proton exchange membrane fuel cell uses, the number of defect sites may be an important factor since it is believed that adsorption takes place at defect sites. Thus, it is likely that graphene layers of nano-scale thickness and millimeter-scale plane or length dimensions would contain many defects sites, both at its edges and within the plane of the structure, and have many active sites for adsorption to occur, and would therefore have advantageous uses in adsorption applications.

If desired, the graphite flakes can be annealed prior to intercalation, in order to increase the purity of the flakes and facilitate intercalation. Annealing involves exposing the raw graphite flakes to high temperatures, on the order of greater than about 2700° C. for anywhere from 15 minutes to one hour and more, as taught, for instance, by U.S. Pat. No. 6,982,874 to Smalc et al.

As noted above, Shane et al., in U.S. Pat. No. 3,404,061, describes a common method for intercalating graphite flakes. Typically, natural graphite flakes are intercalated by dispersing the flakes in a solution containing a mixture of nitric acid and sulfuric acid. The nitric acid and sulfuric acid components of the intercalant solution can be replaced by other acidic compounds, such as potassium chlorate, chromic acid, potassium permanganate, potassium chlorate, potassium dichromate, perchloric acid, or mixtures thereof. Most preferably, the intercalant solution comprises components having a low boiling point and a low heat of vaporization, such as formic acid, acetic acid, or water, or combinations thereof, so that most of the energy of exfoliation results in the greatest expansion of the GICs and, therefore, providing the greatest possible force driving the graphene layers apart.

Intercalation can be so-called spontaneous intercalation, or electrochemical oxidation of the graphite flakes can be practiced during intercalation, as described in U.S. Pat. No. 6,406,612 to Greinke.

Other additives and process parameters can be employed to facilitate intercalation and expansion, such as the use of a supercritical fluid, such as supercritical carbon dioxide, as an intercalant, as described by Kaschak et al. in International Publication No. WO 2004/108997.

As is familiar to the skilled artisan, a supercritical fluid is one which exhibits the properties of a gas when in the liquid state and the properties of a liquid when in the gaseous state. When a gas such as carbon dioxide is contained under high pressure and heated, it changes physical properties, becoming a supercritical fluid. In this state, it has the solvating power of a liquid and the diffusivity of a gas. In short, it has properties of both a gas and a liquid. This means that supercritical fluids work extremely well as a processing media for a wide variety of chemical extractions.

While intercalation with a supercritical fluid can be advantageous for achieving intercalation to the Stage I degree, treatment of the Stage I intercalated flakes with a supercritical fluid like supercritical carbon dioxide can also function to reduce the tendency of the flake to "de-intercalate" to a lower degree of intercalation, and thus a higher Stage of intercalation level (such as from Stage I to Stage V). In addition, treatment of the intercalated flake with a supercritical fluid after completion of intercalation can also improve the expansion of the flake when heated.

While washing of the intercalated flake is commonly practiced when sheets of compressed particles of exfoliated graphite are being prepared, washing tends to lower the degree of intercalation of the flake, thus resulting in a flake having a higher Stage of intercalation than prior to washing (going from Stage II to Stage VII, for instance). Since the process of the present disclosure requires expansion of Stage I, II or III GICs, a washing step should be avoided. Rather, if it is desired to remove surface chemicals form the flake which remain after intercalation, drying processes such as centrifugal drying, freeze drying, filter pressing, or the like, can be practiced, to at least partially remove surface chemicals without having a significant negative effect on degree of intercalation.

Once the graphite flakes are intercalated, and, if desired, exposed to a supercritical fluid and/or dried, they are exfoliated. Exfoliation should be effected by suddenly exposing the Stage I, II or III intercalated graphite flakes to high heat. By "suddenly" is meant that the flakes are brought from a temperature at which the selected GIC is stable to a temperature substantially above its decomposition temperature within a period of less than about 1 second, more preferably no more than about 0.5 second, and even less than about 0.1 second, to achieve the rapid exfoliation desired for complete separation of at least a plurality of graphene layers. Hot contact exfoliation methods, where the flake is directed contacted by a heat source, are not preferred since during hot contact exfoliation the first exfoliated flakes tend to act as insulators and insulate the balance of the flakes (and, thereby inhibit exfoliation). Generating heat within the GIC, for example using an arc, high frequency induction or microwave, etc. is much preferred. The extreme heat of a gas plasma due to temperature (thousands of degrees C.) and the turbulence which would displace the exfoliate is highly preferred. More preferably, the temperature of exfoliation is at least about 1500° C., and in certain preferred embodiments, the temperature of exfoliation is between about 1600° C. and 2400° C. Since graphite begins to degrade at 2500° C., this is the practical upper limit for exfoliation temperature.

During exfoliation, the intercalant inserted between the graphene layers of the graphite (preferably between each graphene layer, as in the case of Stage I intercalation) rapidly vaporizes and literally "blows" the graphene layers apart, with such force that at least some of the graphene layers separate from the exfoliated flake, and form nano-structures.

Exfoliation can be accomplished in certain embodiments by feeding the Stage I, II or III GICs into a reaction zone which includes a region where the temperature is at least about 2600° C.; of course, this is provided that the graphite intercalation compound does not reach a temperature of greater than 2500° C. In certain embodiments, the reaction zone is at an average temperature of at least about 1500° C. This can be accomplished by feeding the GICs through a reaction zone having an inert gas plasma therein, or directly into an arc, to provide the high temperature environment needed for greatest expansion. Desirably, exfoliation occurs in a reducing gas environment, such as hydrogen, to adsorb the reducing gas onto active sites on the graphene layers to protect the active sites from contamination during subsequent handling. In addition, in some embodiments, the exfoliate can pass directly into a liquid suitable to the end use of the exfoliate so that any defect site present can accommodate the chemistry of the end use.

One advantageous method for exfoliation of the GICs prepared in accordance with the present disclosure is to continuously extrude the intercalated flake as a rod through a cooled nozzle opposing a graphite electrode. The extruded flake and graphite electrode can form a pair between which an arc can be struck, which would rapidly heat the Stage I, II or III GICs. A vacuum can be drawn on the system to accelerate exfoliation and direct the stream of exfoliated flake (and individual graphene layers).

The individual graphene layers can then be collected by conventional means, such as by centrifugal collectors, and the like. Contrariwise, the stream of exfoliated/exfoliating GICs as described above can be directed at a suitable support for collection of the individualized graphene layers.

It is anticipated that many of the individual graphene layers, as they separate from the exfoliated flake, or sometime thereafter, will spontaneously assume a three-dimensional shape, such as a buckyball or nano-tube, while the remainder remain as flat plates. In either case, the separation of individual graphene layers from the GICs during or immediately after exfoliation results in the production of nano-structures. These nano-structures can be produced in large, commercially-significant volumes, and more cost efficiently than convention nano-structure production processes.

Referring now to FIG. 1., an apparatus 10 which can be used in an embodiment of the disclosure is illustrated. Apparatus 10 is a conduit having a gas plasma 20 extending from electrode 22 therein; the gas plasma is at a temperature between about 2600° C. and about 10,000° C. The inner spaces of apparatus 10 are a reaction zone 30, in which graphite intercalation compounds 100 are exposed to a temperature between about 1600° C. and about 2400° C. to form nano-scale structures 110. Graphite intercalation compounds 100 are fed into reaction zone 30 by feeder 32, where they are exposed to the temperature of exfoliation, form nano-scale structures 110, and exit reaction zone 30 through egress 34, or other like conduit.

All patents and patent applications referred to herein are hereby incorporated by reference.

It will be apparent to those skilled in the art that various modifications and variations can be made to the present disclosure without departing from the spirit and scope of the disclosure. It is intended that all such modifications and variations are part of the present disclosure provided they come within the scope of the foregoing claims, and their equivalents.

What is claimed is:

1. A process for production of nano-structures, comprising:
providing a graphite flake comprising graphene layers;
intercalating the graphite flake to form a graphite intercalation compound exhibiting Stage I, II or III intercalation;
exfoliating the graphite intercalation compound by exposing it to a temperature between about 1600° C. and about 2400° C., such that a plurality of individual graphene layers are separated from the graphite intercalation compound; and
passing the plurality of individual graphene layers directly into a liquid,
wherein the temperature between 1600° C. and 2400° C. is provided by a gas plasma.

2. The process of claim 1, wherein the graphite flake is intercalated with an intercalant comprising formic acid, acetic acid, water, or combinations thereof.

3. The process of claim 1, wherein the graphite intercalation compound is exposed to a supercritical fluid prior to exfoliation.

4. The process of claim 1, wherein the graphite intercalation compound is brought from a temperature at which it is stable to a temperature between 1600° C. and 2400° C. within a period of no more than about 1 second.

5. The process of claim 4, wherein the graphite intercalation compound is brought from a temperature at which it is stable to a temperature between 1600° C. and 2400° C. within a period of no more than about 0.5 second.

6. The process of claim 1, wherein exfoliation is accomplished by feeding the graphite intercalation compound into a reaction zone which includes a region where the temperature is at least about 2600° C.

7. The process of claim 6, wherein exfoliation, occurs in a reducing gas environment.

8. The process of claim 7, wherein exfoliation occurs in a hydrogen environment.

9. The process of claim 1, wherein the liquid is suitable for an end use of the individual graphene layers, and wherein the individual graphene layers comprise one or more defect sites, said one or more defect sites being capable of accommodating substances associated with said end use of the individual graphene layers.

10. The process of claim 9, wherein said one or more defect sites adsorb said substances during said end use.

11. A process for production of nano-structures, comprising:
providing microcrystalline graphite having a purity of at least 90% comprising a graphite flake comprising graphene layers, which comprise a plurality of defect sites within the plane of the graphene structure;
intercalating the graphite flake to form a graphite intercalation compound exhibiting Stage I, II or III intercalation;
at least partially removing chemicals used for intercalation from the surface of the graphite intercalation compound in a drying process; and
exfoliating the graphite intercalation compound in a reducing gas environment by exposing it to a temperature between about 1600° C. and about 2400° C. such that a plurality of individual graphene layers have one or more active sites onto which reducing gas is adsorbed and are separated from the graphite intercalation compound.

12. The process of claim 11, further comprising passing the plurality of individual graphene layers into a liquid suitable for an end use of the individual graphene layers, wherein the one or more active sites are adapted to accommodate substances associated with said end use of the individual graphene layers.

13. The process of claim 12, wherein said one or more active sites adsorb said substances during said end use.

14. The process of claim 11, wherein the graphite flake is intercalated with an intercalant comprising formic acid, acetic acid, water, or combinations thereof.

15. The process of claim 11, wherein the graphite intercalation compound is exposed to a supercritical fluid prior to exfoliation.

16. The process of claim 11, wherein the temperature is generated by high frequency induction and the graphite intercalation compound is fed into a gas plasma.

17. The process of claim 11, wherein the graphite intercalation compound is brought from a temperature at which it is stable to a temperature between 1600° C. and 2400° C. within a period of no more than about 1 second.

18. The process of claim 11, wherein the graphite intercalation compound is brought from a temperature at which it is stable to a temperature between 1600° C. and 2400° C. within a period of no more than about 0.5 second.

19. The process of claim 11, wherein exfoliation is accomplished by feeding the graphite intercalation compound into a reaction zone which includes a region where the temperature is at least about 2600° C.

20. The process of claim 11, wherein exfoliation occurs in a hydrogen environment.

21. The process of claim 11, wherein the drying process comprises centrifugal drying, freeze drying, or filter pressing.

22. The process of claim 11, further comprising drawing a vacuum on the exfoliating graphite and directing the exfoliated graphite by means of the drawn vacuum.

23. The process of claim 11, wherein the temperature between 1600° C. and 2400° C. is provided by a gas plasma.

24. A process for production of nano-structures, comprising:
providing a graphite flake comprising graphene layers;
intercalating the graphite flake to form a graphite intercalation compound exhibiting Stage I, II or III intercalation;
feeding the graphite intercalation compound through a reaction zone;
exfoliating the graphite intercalation compound by exposing it to a temperature between about 1600° C. and about 2400° C., such that a plurality of individual graphene layers are separated from the graphite intercalation compound;
keeping the graphene layers in an inert or protective environment; and
passing the plurality of individual graphene layers directly into a liquid.

25. The process of claim 24, wherein heat in the reaction zone is provided by a gas plasma.

26. A process for production of nano-structures, comprising:
providing microcrystalline graphite having a purity of at least about 90% comprising a graphite flake comprising graphene layers;
intercalating the graphite flake to form a graphite intercalation compound exhibiting Stage I, II or III intercalation;
exfoliating the graphite intercalation compound in an inert gas or a reducing gas environment by exposing it to a temperature between about 1600° C. and about 2400° C., such that a plurality of individual graphite layers are separated from the graphite intercalation compound;
drawing a vacuum on the exfoliating graphite;
directing the exfoliated graphite by means of the drawn vacuum; and
passing the plurality of individual graphene layers directly into a liquid.

27. The process of claim 26, wherein the temperature between 1600° C. and 2400° C. is provided by a gas plasma.

* * * * *